United States Patent
Schwarzband et al.

(10) Patent No.: US 9,715,724 B2
(45) Date of Patent: Jul. 25, 2017

(54) REGISTRATION OF CAD DATA WITH SEM IMAGES

(71) Applicant: Applied Materials Israel Ltd., Rehovot (IL)

(72) Inventors: Ishai Schwarzband, Or-Yehuda (IL); Yan Ivanchenko, Nes-Tziona (IL); Daniel Ravid, Herzelia (IL); Orly Zvitia, Tel-Aviv (IL); Idan Kaizerman, Meitar (IL)

(73) Assignee: Applied Materials Israel Ltd., Rehovot (IL)

(*) Notice: Subject to any disclaimer, the term of this patent is extended or adjusted under 35 U.S.C. 154(b) by 40 days.

(21) Appl. No.: 14/446,295

(22) Filed: Jul. 29, 2014

(65) Prior Publication Data

US 2016/0035076 A1    Feb. 4, 2016

(51) Int. Cl.
  *G06K 9/00*   (2006.01)
  *G06T 7/00*   (2017.01)
  *G06K 9/62*   (2006.01)

(52) U.S. Cl.
  CPC ............ *G06T 7/001* (2013.01); *G06K 9/6211* (2013.01); *G06K 2209/403* (2013.01); *G06T 2207/10028* (2013.01); *G06T 2207/10061* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 4,485,873 A | 12/1984 | Balzer et al. | |
| 4,745,550 A * | 5/1988 | Witkin | G01V 1/32 382/109 |

(Continued)

FOREIGN PATENT DOCUMENTS

| EP | 236972 A1 | 9/2011 |
|---|---|---|
| EP | 2779093 A2 | 9/2014 |

(Continued)

OTHER PUBLICATIONS

Marinello et al., "Critical Factors in SEM 3D Stereo Microscopy," Measurement Science and Technology, vol. 19, No. 06, year 2008, pp. 1-13.

(Continued)

*Primary Examiner* — Iman K Kholdebarin
(74) *Attorney, Agent, or Firm* — Lowenstein Sandler LLP

(57) ABSTRACT

A method for image processing includes providing a microscopic image of a structure fabricated on a substrate and computer-aided design (CAD) data used in fabricating the structure. The microscopic image is processed by a computer so as to generate a first directionality map, which includes, for a matrix of points in the microscopic image, respective directionality vectors corresponding to magnitudes and directions of edges at the points irrespective of a sign of the magnitudes. The CAD data are processed by the computer so as to produce a simulated image based on the CAD data and to generate a second directionality map based on the simulated image. The first and second directionality maps are compared by the computer so as to register the microscopic image with the CAD data.

34 Claims, 6 Drawing Sheets

(56) References Cited

U.S. PATENT DOCUMENTS

| | | | |
|---|---|---|---|
| 4,778,745 A * | 10/1988 | Leung | G03F 1/84 356/237.6 |
| 5,502,306 A * | 3/1996 | Meisburger | G01R 31/307 250/307 |
| 5,578,821 A * | 11/1996 | Meisberger | H01J 37/28 250/310 |
| 5,665,968 A * | 9/1997 | Meisburger | H01J 37/28 250/306 |
| 6,429,427 B1 | 8/2002 | Frosien | |
| 6,573,498 B1 | 6/2003 | Rangarajan et al. | |
| 6,930,308 B1 | 8/2005 | Lorusso et al. | |
| 7,005,641 B2 | 2/2006 | Nakasuji et al. | |
| 7,067,808 B2 | 6/2006 | Kochi et al. | |
| 7,559,047 B2 * | 7/2009 | Miyamoto | G03F 7/70625 382/144 |
| 7,705,304 B2 | 4/2010 | Kawamata et al. | |
| 7,732,792 B2 | 6/2010 | Matsuoka et al. | |
| 7,792,351 B1 | 9/2010 | Toth et al. | |
| 7,875,850 B2 | 1/2011 | Nakayama et al. | |
| 8,094,920 B2 | 1/2012 | Sugiyama et al. | |
| 8,237,119 B2 | 8/2012 | Nakahira et al. | |
| 8,295,584 B2 | 10/2012 | Sato et al. | |
| 8,405,045 B2 | 3/2013 | Preikszas et al. | |
| 8,589,108 B2 * | 11/2013 | Nikaido | G01R 31/307 702/117 |
| 8,604,427 B2 | 12/2013 | Schwarzband et al. | |
| 8,767,038 B2 * | 7/2014 | Miyamoto | G01B 15/04 250/307 |
| 8,774,493 B2 * | 7/2014 | Yang | G06T 11/00 382/141 |
| 8,946,627 B2 | 2/2015 | Schwarzband et al. | |
| 2002/0156594 A1 * | 10/2002 | Houge | G03F 7/70491 702/127 |
| 2002/0170021 A1 * | 11/2002 | Houge | G03F 7/70625 716/136 |
| 2004/0084622 A1 * | 5/2004 | Kadyshevitch | H01J 37/32935 250/310 |
| 2005/0161601 A1 | 7/2005 | Kochi et al. | |
| 2005/0279934 A1 | 12/2005 | Stewart et al. | |
| 2006/0087330 A1 * | 4/2006 | Saito | G01R 31/307 324/754.03 |
| 2006/0110042 A1 * | 5/2006 | Onishi | G06K 9/6211 382/199 |
| 2006/0288325 A1 * | 12/2006 | Miyamoto | G03F 7/70625 716/50 |
| 2007/0036400 A1 * | 2/2007 | Watanabe | G06K 9/6857 382/124 |
| 2007/0057687 A1 * | 3/2007 | Kadyshevitch | G01R 31/307 324/754.22 |
| 2007/0092129 A1 | 4/2007 | Sugiyama et al. | |
| 2007/0213942 A1 * | 9/2007 | Ponson | G01N 3/068 702/36 |
| 2008/0251868 A1 | 10/2008 | Nakayama et al. | |
| 2009/0039263 A1 | 2/2009 | Matsuoka et al. | |
| 2009/0096790 A1 * | 4/2009 | Wiedemann | G06K 9/00201 345/427 |
| 2009/0208090 A1 * | 8/2009 | Nishiura | G06K 9/6255 382/149 |
| 2009/0236523 A1 | 9/2009 | Nakamura | |
| 2009/0238443 A1 | 9/2009 | Sato et al. | |
| 2009/0266985 A1 | 10/2009 | Nakahira et al. | |
| 2010/0303334 A1 * | 12/2010 | Kitamura | G06K 9/00 382/141 |
| 2010/0330499 A1 | 12/2010 | Bae et al. | |
| 2011/0036981 A1 | 2/2011 | Zhao et al. | |
| 2012/0151428 A1 * | 6/2012 | Tanaka | G01B 15/04 716/112 |
| 2012/0194545 A1 * | 8/2012 | Shibata | G06F 3/0425 345/629 |
| 2012/0207397 A1 * | 8/2012 | Nagatomo | G06K 9/6203 382/218 |
| 2012/0308152 A1 * | 12/2012 | Yang | G06T 11/00 382/257 |
| 2013/0200255 A1 * | 8/2013 | Schwarzband | H01J 37/244 250/252.1 |
| 2013/0202187 A1 * | 8/2013 | Goren | G01N 21/9501 382/149 |
| 2013/0204569 A1 * | 8/2013 | Goren | G01N 21/9501 702/117 |
| 2013/0279790 A1 * | 10/2013 | Kaizerman | G06T 7/001 382/144 |
| 2013/0279791 A1 * | 10/2013 | Kaizerman | G06T 7/0004 382/145 |
| 2013/0288182 A1 | 10/2013 | Branton et al. | |
| 2015/0131891 A1 * | 5/2015 | Kim | G06T 7/001 382/144 |
| 2015/0136976 A1 * | 5/2015 | Matsuoka | H01J 37/222 250/306 |
| 2015/0377921 A1 * | 12/2015 | Ukraintsev | G01Q 30/02 324/750.19 |
| 2016/0035076 A1 * | 2/2016 | Schwarzband | G06T 7/001 382/149 |
| 2016/0188784 A1 | 6/2016 | Bhattacharyya et al. | |
| 2016/0246185 A1 * | 8/2016 | Ypma | G03F 7/70508 |

FOREIGN PATENT DOCUMENTS

| | | |
|---|---|---|
| JP | 3499690 B2 | 2/2004 |
| JP | 3802525 B2 | 7/2006 |
| JP | 2009-517844 A | 4/2009 |
| JP | 4336488 B2 | 9/2009 |
| KR | 2005-00050658 A | 5/2005 |
| KR | 2011-0002801 A | 1/2011 |
| TW | 201132968 A | 10/2011 |
| WO | 2007067296 A2 | 6/2007 |

OTHER PUBLICATIONS

Maurer, William, "To Share and To Learn", Bacus News, vol. 27, Issue 2, Feb. 2011, pp. 1-5.

Frankot, et al., "A Method for Enforcing Integrability in Shape from Shading Algorithms," IEEE Transactions on Pattern Analysis and Machine Intelligence, vol. 10, No. 4, Jul. 1988, pp. 439-451.

Harada, et al., "A New CDSEM Metrology Method for Thin Film Hardmasks Patterns using Multiple Detectors," Photomask, Japan, Yokohama, Apr. 13-15, 2010 (published in BACUS News, vol. 27, issue 2, Feb. 2011).

Serulnik, Sergio David, et al., "Automatic Defect Classification using Topogrphy Map from SEM Photometric Stereo," SPIE Proceedings, Data Analysis and Modeling for Process Control, Apr. 29, 2004, vol. 5378, pp. 124-133.

* cited by examiner

REGISTRATION OF CAD DATA WITH SEM IMAGES

FIELD OF THE INVENTION

The present invention relates generally to methods and systems for automated inspection, and particularly to detection and classification of defects in microelectronic devices.

BACKGROUND

Advanced microscopic imaging tools, such as a scanning electron microscope (SEM), are often used in inspection of semiconductor wafers in order to detect and classify defects in production of microelectronic devices. SEM images, however, contain a wealth of detail, which must be properly interpreted in order to identify the structures appearing in each image and to distinguish the defects from other features. Identification and delineation of the structures in such an image is commonly referred to as image segmentation. Various techniques are known in the art for automated segmentation of SEM images to assist in proper image interpretation.

In some cases, SEM images are segmented by comparing the images with computer aided design (CAD) data that have been used in production of the devices under inspection. For example, U.S. Pat. No. 7,792,351 describes a method for defect review using image segmentation, in which an electron image of the area containing a previously-detected potential defect is obtained. The image may then be aligned to the CAD layout of the integrated circuit. The alignment may be performed, for example, by locating a dominant edge in the image that is expected to be within the field of view (FOV) based upon the design information. Similarly, U.S. Pat. No. 8,036,445 describes a method of position matching between an image of a semiconductor pattern, such as a SEM image, and CAD data.

As another example of the use of CAD data in SEM image processing, U.S. Patent Application Publication US 2009/0238443 describes a method in which a correlation operation is used for determining positions of a critical dimension SEM (CD-SEM) image and a CAD data pattern (referred to as a template). Specifically, through an evaluation based on correlation operation for determining positions of the template and the CD-SEM image in two-dimensional directions, an X-Y position in which the template image and the CD-SEM image have the highest correlation is determined, and the template image is overlaid with the CD-SEM image at the position.

Other methods that use CAD data to assist in SEM image processing are described in U.S. Patent Application Publications US 2007/0092129, US 2009/0039263, US 2009/0266985, and US 2009/0236523.

SUMMARY

Embodiments of the present invention that are described hereinbelow provide improved methods, systems and software for analysis of microscopic images using CAD data.

There is therefore provided, in accordance with an embodiment of the present invention, a method for image processing, which includes providing a microscopic image of a structure fabricated on a substrate and computer-aided design (CAD) data used in fabricating the structure. The microscopic image is processed by a computer so as to generate a first directionality map, which includes, for a matrix of points in the microscopic image, respective directionality vectors corresponding to magnitudes and directions of edges at the points irrespective of a sign of the magnitudes. The CAD data are processed by the computer so as to produce a simulated image based on the CAD data and to generate a second directionality map based on the simulated image. The first and second directionality maps are compared by the computer so as to register the microscopic image with the CAD data.

In a disclosed embodiment, the substrate is a semiconductor wafer, and the structure is a part of a microelectronic device formed on the wafer, and providing the microscopic image includes capturing the image using a scanning electron microscope (SEM).

Typically, each of the first and second directionality maps is generated by applying a gradient operator to an image, thereby computing a respective gradient vector at each point, and doubling an angular component of the gradient vector at each point to find the directionality vectors.

In some embodiments, processing the microscopic image and the CAD data includes post-processing the directionality vectors in at least one of the first and second directionality maps so as to modify the magnitudes of at least some of the directionality vectors responsively to the directions thereof. Post-processing the directionality vectors may include applying an operation to the directionality vectors selected from a group of operations consisting of whitening, X-Y balancing, and corner balancing.

In a disclosed embodiment, comparing the first and second directionality maps includes computing a correlation map between the first and second directionality maps, and identifying a peak in the correlation map in order to define a transformation between the CAD data and the microscopic image.

Additionally or alternatively, processing the microscopic image includes generating, based on the microscopic image, a first height map indicative of a three-dimensional (3D) shape of the structure, and processing the CAD data includes generating a second height map of the structure based on the CAD data, and creating the correlation map includes combining a first comparison of the first and second directionality maps with a second comparison of the first and second height maps in order to register the microscopic image with the CAD data.

There is also provided, in accordance with an embodiment of the present invention, apparatus for image processing, including a memory, which is configured to store a microscopic image of a structure fabricated on a substrate and computer-aided design (CAD) data used in fabricating the structure. A processor is configured to process the microscopic image so as to generate a first directionality map, which includes, for a matrix of points in the microscopic image, respective directionality vectors corresponding to magnitudes and directions of edges at the points irrespective of a sign of the magnitudes, and to process the CAD data so as to produce a simulated image based on the CAD data and to generate a second directionality map based on the simulated image, and to compare the first and second directionality maps so as to register the microscopic image with the CAD data.

There is additionally provided, in accordance with an embodiment of the present invention, a computer software product, including a non-transitory computer-readable medium in which program instructions are stored, which instructions, when read by a computer, cause the computer to receive a microscopic image of a structure fabricated on a substrate and computer-aided design (CAD) data used in fabricating the structure, to process the microscopic image so as to generate a first directionality map, which includes, for a matrix of points in the microscopic image, respective directionality vectors corresponding to magnitudes and directions of edges at the points irrespective of a sign of the magnitudes, to process the CAD data so as to produce a simulated image based on the CAD data and to generate a second directionality map based on the simulated image, and to compare the first and second directionality maps so as to register the microscopic image with the CAD data.

The present invention will be more fully understood from the following detailed description of the embodiments thereof, taken together with the drawings in which:

DETAILED DESCRIPTION OF EMBODIMENTS

Figure 1:
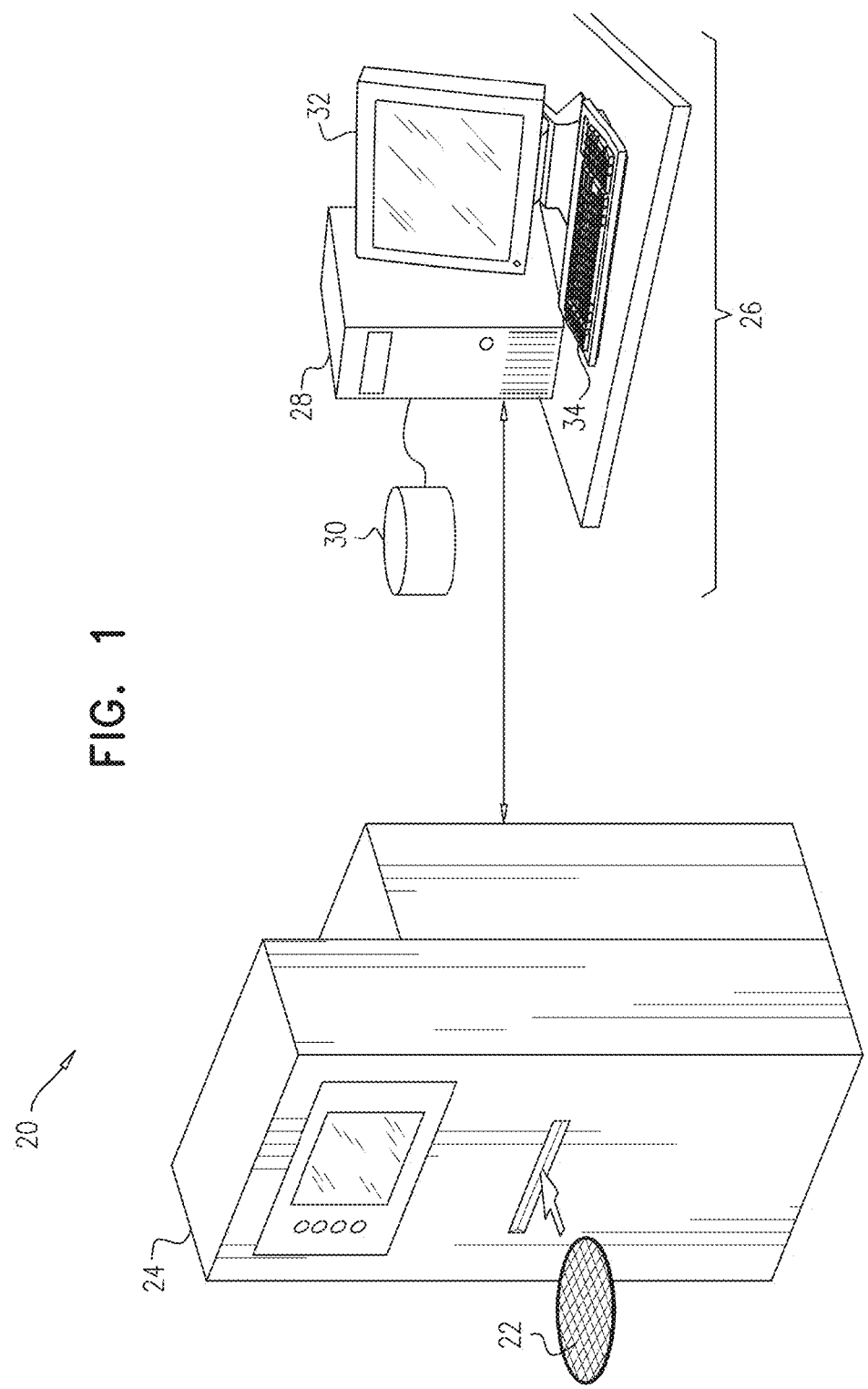
FIG. 1 is a schematic, pictorial illustration of an automated inspection system, in accordance with an embodiment of the present invention.

Registration of SEM images with CAD data is a useful technique for segmenting and thus extracting information from the images. Once the SEM image has been segmented in this manner, image processing techniques can be effectively and efficiently applied, for example, in measuring the locations and shapes of structures in the image and the distances between them. When manufacturing defects are detected in the SEM image, the CAD-based segmentation makes it possible to pinpoint the locations of such defects relative to the functional elements of the device under inspection.

Accurate, unambiguous registration of SEM images with the corresponding CAD data, however, can be difficult to achieve, particularly because such registration involves matching images produced by such different modalities. Consequently, the visual appearance of an image simulated from the CAD data may often be markedly different from the result printed on the wafer. Structures in the images and CAD data are often complex and repetitive. Furthermore, SEM images tend to be noisy and have low contrast. The transition direction of a given edge of a structure appearing in the image may vary under different imaging conditions, i.e., the edge may appear as a transition from dark to light under some conditions and from light to dark under others. For these and other reasons, it can be difficult to generate a faithful simulated image from CAD data for purposes of registration with the SEM image. Similar problems can occur in registration of CAD data with other sorts of microscopic images, such as images generated by optical microscopy.

Embodiments of the present invention that are described hereinbelow address these problems by providing efficient and reliable methods for registration between microscopic images and CAD data. These methods use directionality maps, which comprise respective directionality vectors at a matrix of points in an image (actual or simulated), corresponding to magnitudes and directions of edges at these points. The directions of the directionality vectors are irrespective of the sign of the corresponding edge magnitude, so that ambiguities between light-to-dark and dark-to-light transitions are inherently resolved.

Typically, the directionality map is generated by applying a gradient operator to the image, thereby computing a respective gradient vector (represented as a complex number with magnitude and angle components) at each point in the image, and doubling the angular component of the gradient vector's angle at each point to find the directionality vectors. Such directionality maps are relatively insensitive to variations in image intensity, contrast, noise, and imaging conditions, with the particular benefit that an edge oriented at a certain angle will have the same directionality regardless of whether the sign of the edge is positive or negative.

In the disclosed embodiments, CAD data are processed by computer to generate a simulated image. A microscopic image and the corresponding simulated CAD image are then processed independently to generate respective directionality maps. The computer compares these directionality maps in order to register the maps, and thus calculates the correct registration between the microscopic image and the CAD data. Typically, the images are compared by computing a correlation map between the two directionality maps as a function of relative shift (vertical and horizontal) and possibly of rotation and scaling. A peak in the correlation map identifies a transformation (a shift, or more generally an affine transform) between the CAD data and the microscopic image that can be applied in order to bring the data and the image into mutual registration.

In some embodiments, the computer applies post-processing steps to the directionality vectors in one or both of the directionality maps in order to improve map quality before comparison is attempted. Typically, the post-processing modifies the magnitudes of at least some of the directionality vectors as a function of their directions. The filtering post-processing operations may include, for example, whitening the spatial frequency spectra of the vectors, balancing horizontal (X) and vertical (Y) directional components, and/or balancing rectilinear (horizontal and vertical) components against corners.

Additionally or alternatively, the microscopic images and CAD data may be processed to generate respective height maps, indicative of the three-dimensional (3D) shape of the structures in the field of view. These actual and simulated height maps may then be compared, in addition to the comparison of the directionality maps, in order to more accurately register the microscopic images with the CAD data.

FIG. 1 is a schematic, pictorial illustration of a system 20 for automated defect inspection and classification, in accordance with an embodiment of the present invention. A sample, such as a patterned semiconductor wafer 22, is inserted into an inspection machine 24. This machine may comprise, for example, a scanning electron microscope (SEM) or an optical inspection device or any other suitable sort of inspection apparatus that is known in the art. Machine 24 images the surface of wafer 22, processes the results, and outputs microscopic images, which may show defects on the wafer. Although the examples presented in the description that follows relate specifically to SEM images, the principles of the disclosed embodiments may similarly be applied to microscopic images of other sorts.

An image processing machine 26 receives and processes the images output by inspection machine 24. Image processing machine 26 typically comprises apparatus in the form of a general-purpose computer, comprising a processor 28 with a memory 30 for holding images and the CAD data, along with a user interface comprising a display 32 and input device 34. In general, memory 30 is loaded with the CAD data that were used in producing the structures on wafer 22 that are imaged by inspection machine 24. Alternatively or additionally, CAD data may be streamed from a separate CAD server (not shown). Machine 26 generates simulated CAD-based images and registers these images with the actual images received from machine 24.

Processor 28 is typically programmed in software to carry out the functions that are described herein. The software may be downloaded to the processor in electronic form, over a network, for example, or it may, alternatively or additionally, be stored in tangible, non-transitory computer-readable storage media, such as optical, magnetic, or electronic memory media (which may be comprised in memory 30, as well). The computer implementing the functions of image processing machine 26 may be dedicated to the present image processing functions, or it may perform additional computing functions, as well, such as automatic defect identification and classification with the help of the registered images. Alternatively or additionally, the functions of machine 26 may be integrated into inspection machine 24 or otherwise distributed among multiple processors in one or a number of separate computers. As another alternative, at least some of the image processing functions described herein may be performed by dedicated or programmable hardware logic.

Figure 2:
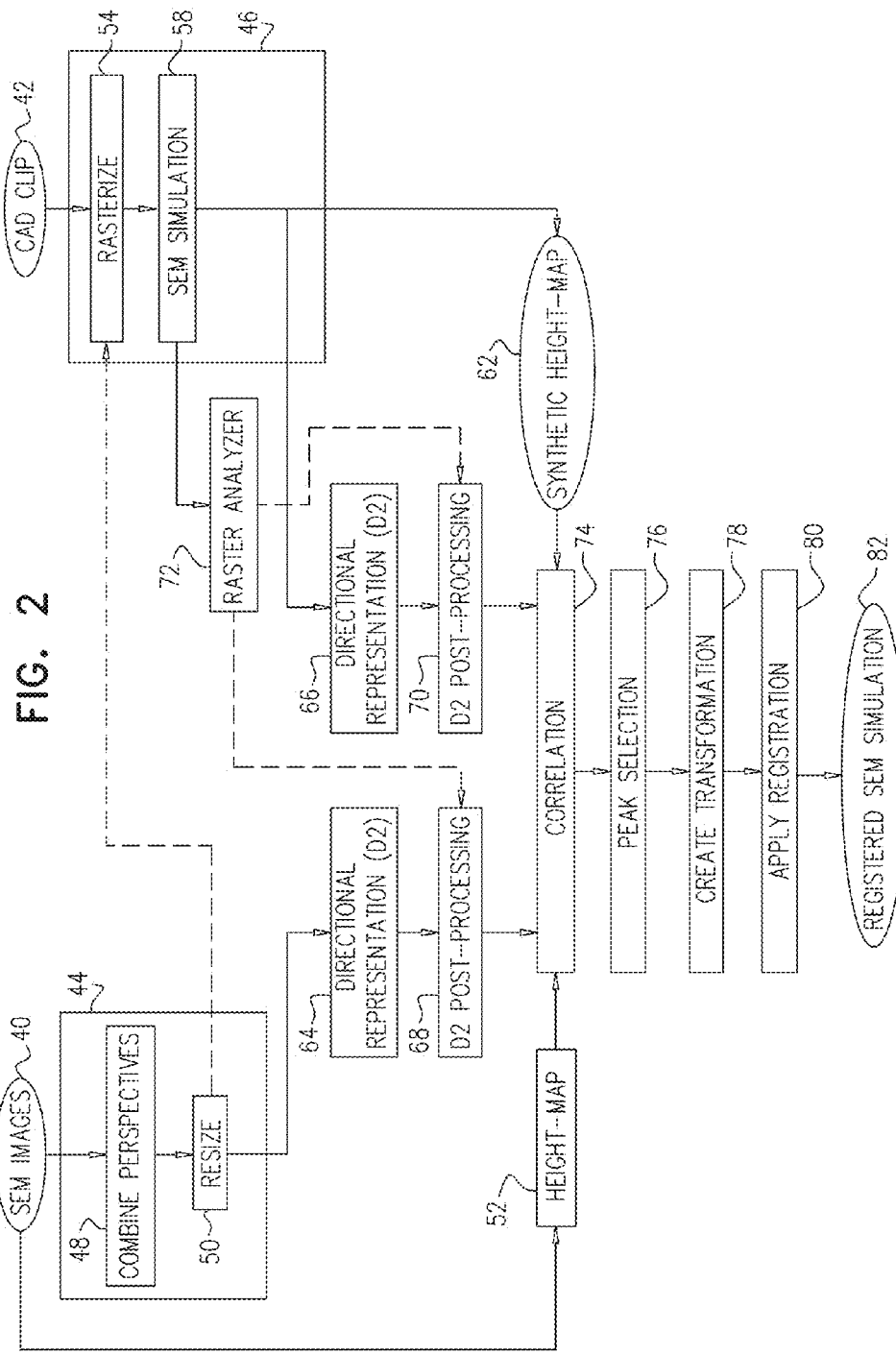
FIG. 2 is a flow chart that schematically illustrates a method for registration of CAD data with a SEM image, in accordance with an embodiment of the present invention.
Figure 3:
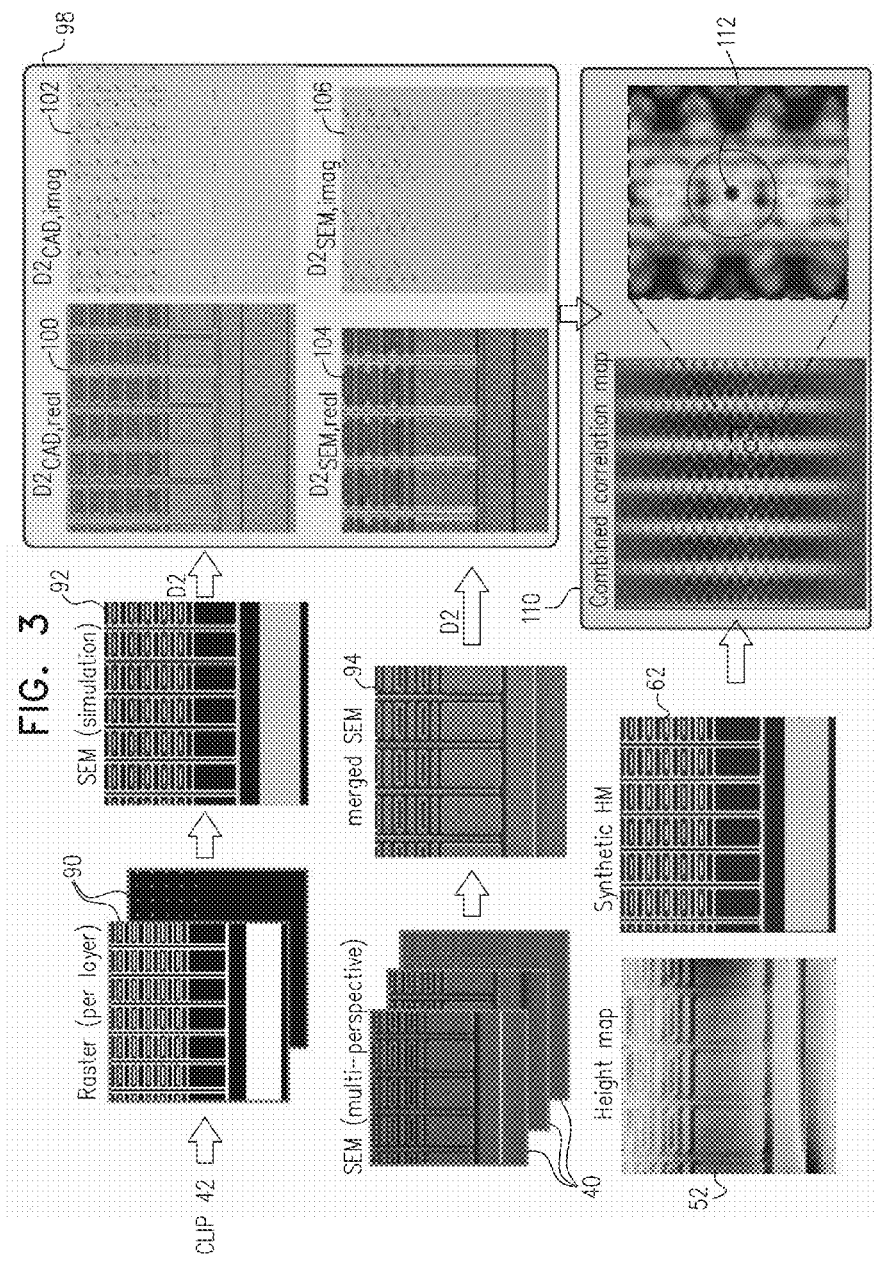
FIG. 3 is a flow chart showing schematically, in graphical form, data generated at various stages in the method of FIG. 2, in accordance with an embodiment of the present invention.

Reference is now made to FIGS. 2 and 3, which schematically illustrate a method for registration of CAD data with a SEM image, in accordance with an embodiment of the present invention. FIG. 2 is a flow chart showing the steps in the method, while FIG. 3 shows images representative of the inputs and outputs at various steps. This method may be carried out by image processing machine 26, using images and CAD data relating to structures on wafer 22. Alternatively, the method may be applied to other sorts of images and samples, in substantially any suitable sort of system for microscopic imaging and analysis.

In the present example, processor 28 applies the method of FIG. 2 to one or more SEM images 40 and corresponding CAD data 42, referred to as a "CAD clip," since a portion of the CAD data relating to the area of image 40 is "clipped" from the overall CAD file. Typically, the dimensions of the CAD clip are larger than the SEM image, in order to ensure that when registered, the entire SEM image will be contained within the area of the CAD clip, but alternatively, processor 28 can work with partial overlap (for example, at least 50% overlap on each axis) between the SEM image and CAD clip. Prior to the registration process itself, the processor pre-processes the SEM image and CAD clip in respective pre-processing stages 44 and 46.

In pre-processing stage 44, processor 28 may combine multiple SEM images 40 of the same area, taken from different perspectives (typically using different detectors in the SEM machine), at an image combination step 48. As different image features may appear more strongly at different perspectives, merging the images in this way is useful in giving a clearer merged SEM image 94, as shown in FIG. 3. Optionally, the different perspectives may be used to generate a height map 52, which is a three-dimensional (3D) topographical model of the surface of wafer 22, showing the 3D shape of the structure in SEM images 40. Methods for generating height maps of this sort are described, for example, in U.S. Patent Application Publication 2013/0200255, whose disclosure is incorporated herein by reference.

Processor 28 may resize the resulting SEM images, i.e., it may adjust the image resolution in order to accelerate subsequent operations, at a resizing step 50. For this purpose, the processor typically resamples the image pixel values in order to give a smaller number of pixels if desired.

The CAD data in clip 42 are organized in multiple layers, corresponding to the device layers that are built up on wafer 22. The contents of each layer are defined in terms of polygons of certain shapes, sizes and positions. In stage 46, processor 28 converts the multi-layer CAD data into a single, simulated raster image. For this purpose, processor 28 first converts the polygons in each layer of clip 42 into a raster image, at a rasterizing step 54, giving a set of raster images 90 corresponding to the layers, as shown in FIG. 3. The resolution of the raster is chosen to be equal to the resolution of the SEM image that is set at step 50.

Processor 28 overlays these raster images 90, one upon another, to give a combined, overlaid image, in a SEM simulation step 58. For this purpose, the processor uses the visibility order of the layers in order to determine which features should be visible in the simulated SEM image and which should be hidden by overlying features in higher layers. Processor 28 then modifies this overlaid image in order to simulate the effect that actual fabrication and SEM imaging would have on the structures that are visible in the image yielding a simulated SEM image 92 (FIG. 3). Step 58 may involve, for example, rounding sharp corners and smoothing sharp edges in the image.

Processor 28 converts the CAD image into a synthetic height map 62, to be compared with the actual height map 52 that is derived from SEM images 40.

Processor 28 transforms the actual and simulated SEM images into respective directionality maps, at respective directional representation steps 64 and 66. For this purpose, the processor applies a gradient operator to each image, thus computing a respective gradient vector D at each point in the image, and then doubles the angular component of the gradient vector at each point to find the directionality vector D2. As a result, variations in the signs of edge transitions are canceled out, so that an edge that is oriented at a given angle will have the same directionality vector regardless of the sign of the magnitude. As noted earlier, this feature of the directionality map is particularly useful in resolving ambiguities that frequently occur in microscopic imaging.

Another feature of the directionality map is the separation of rectilinear edge components in the image, i.e., the rectilinear components oriented in the horizontal (X) and vertical (Y) directions are separated from corner edge components, which have other orientations. In a complex representation of the directionality, the real part of the directionality vector D2 contains the rectilinear components, while the imaginary part contains the corner components.

This feature of the directionality is illustrated by directionality maps 98, shown in FIG. 3, as derived in steps 64 and 66: Images 100 and 104 show, at each point in the images, the magnitudes of the real components of the directionality maps derived from the simulated and actual SEM images, while images 102 and 106 show the magnitudes of the imaginary components. Despite the contrast variations and edge sign reversals that can be observed in comparing simulated SEM image 92 and actual SEM image 94, processor 28 can now observe a strong resemblance in form between the rectilinear and corner components in the directionality maps.

To strengthen the correlation between the directionality maps and minimize the impact of spurious map components, processor 28 may post-process one or both of the actual and simulated directionality maps, at respective post-processing steps 68 and 70. Generally speaking, these steps involves transforming the directionality vectors in one or both of directionality maps so as to modify the magnitudes of at least some of the directionality vectors on the basis of their directions. Details of steps 68 and 70 are described hereinbelow with reference to FIG. 4.

The post-processing performed at steps 68 and 70 may make use of features of the simulated SEM image that are extracted at a raster analysis step 72. This raster analysis calculates CAD attributes based on the raster images, and these attributes may then be applied to control and tune aspects of steps 68 and 70. For example, the raster analyzer may determine whether the CAD are one-dimensional and control X-Y balancing accordingly.

To find the offset between the actual and simulated SEM images, processor 28 computes a gradient-based correlation based on the actual and simulated directionality maps, at a correlation step 74. The correlation map contains the magnitude of the vector correlation result as a function of a variable (X,Y) offset between the actual and simulated directionality maps. Optionally, a relative rotation and/or scaling between the maps may also be taken into account. Typically, the correlation is computed for all possible offsets of SEM image 40 within the larger area of CAD clip 42. In addition, processor 28 may compute and use an area-based correlation between actual height map 52 and synthetic height map 62 as a supplement to the correlation of the directionality maps, in order to resolve correlation ambiguity that might occur when using gradient-based correlation only. Details of step 74 are described hereinbelow with reference to FIG. 5.

The result of step 74 is a combined correlation map 110 (FIG. 3), which shows the correlation result as a function of the (X,Y) offset. Processor 28 seeks a peak 112 in correlation map 110 as a function of the offset, at a peak selection step 76. The peak location indicates the relative shift that is required to bring the input maps into mutual registration. Based on the peak location, processor 28 computes a transformation to be applied between SEM image 40 and CAD clip 42, at a transformation creation step 78. The processor then applies this transformation to clip 42 in order to bring the CAD data into alignment with image 40, at a registration step 80. The result of this step is a simulated SEM image 82, which is registered with SEM image 40 and can be used for segmentation and further processing of the SEM image. Details of steps 78 and 80 are presented hereinbelow with reference to FIG. 6.

Figure 4:
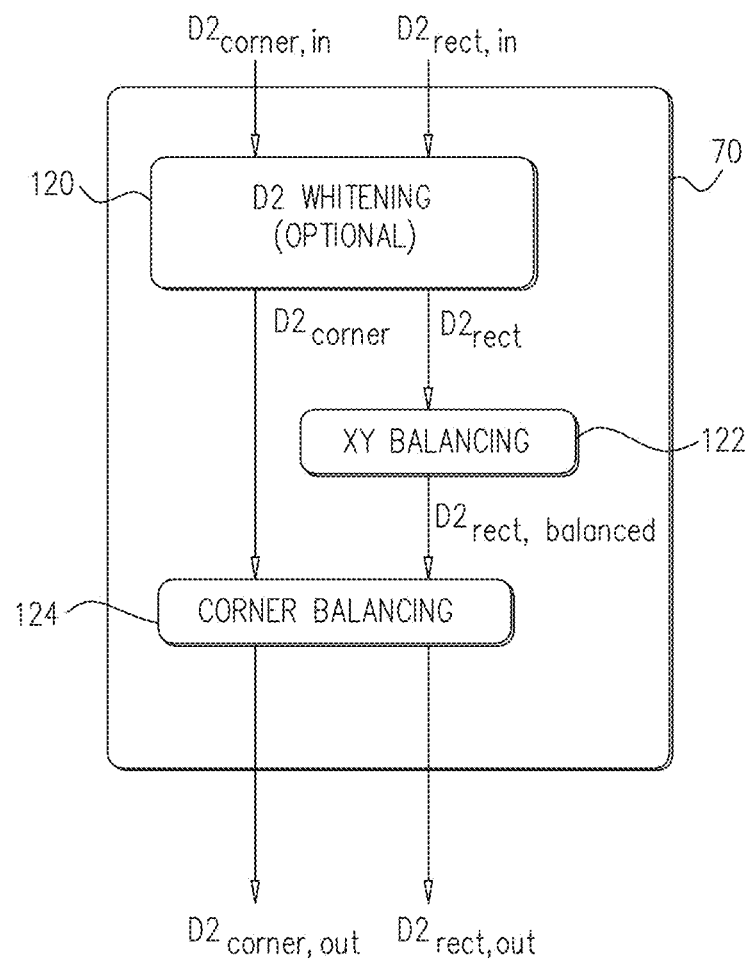
FIG. 4 is a flow chart that schematically illustrates a method for post-processing of an edge directionality map, in accordance with an embodiment of the present invention.

FIG. 4 is a flow chart that schematically shows details of post-processing step 70, in accordance with an embodiment of the present invention. Post-processing step 68 may include similar elements, mutatis mutandis. Step 70 may include one or more of the following operations, applied to the D2 directionality map:

A whitening operation 120. At this step, processor 28 applies a frequency-dependent filter to components of the directionality map in order to attenuate ("whiten") by a certain degree the peaks in the frequency spectrum and possibly to amplify weak frequency components. This sort of whitening is useful particularly in reducing the impact of high-frequency image components that are inessential to the actual device structure and might otherwise reduce the accuracy of the correlation result found at step 74. In addition, this step may include frequency selectivity in order to attenuate specific gradient frequencies that might interfere with the correlation result.

Processor 28 may apply operation 120 to the rectilinear components or the corner components of the directionality map, or both. When filtering the rectilinear components of the directionality map, the processor may apply different filters to the X (horizontal) and Y (vertical) rectilinear components of the image.

An X-Y balancing operation 122. Processor 28 typically applies this operation to the rectilinear part of the directionality map in order to balance the horizontal and vertical rectilinear components of the image, so that their relative impacts on the subsequent correlation computation are roughly the same. For this purpose, the processor may apply X and Y weighting factors to the directionality components. Processor 28 may compute the weighting factors automatically based on an energy equalization principle. The weighting strength may be restricted to a certain range in order to avoid too aggressive balancing.

A corner balancing operation 124. This operation is similar in nature to X-Y balancing, but is instead directed to balancing the contributions of the corner components and rectilinear components of directionality in the subsequent correlation transformation. Processor 28 may compute the corner weighting factor automatically based on analysis of the polygons of the CAD clip.

The above post-processing operations are described by way of example. Although the operations are shown in a certain order, the order of steps may be changed in other implementations, and not all of the above operations will necessarily be used in all situations. Furthermore, other post-processing operations, as are known in the art of image processing, may be applied at steps 68 and 70 and are considered to be within the scope of the present invention.

Figure 5:
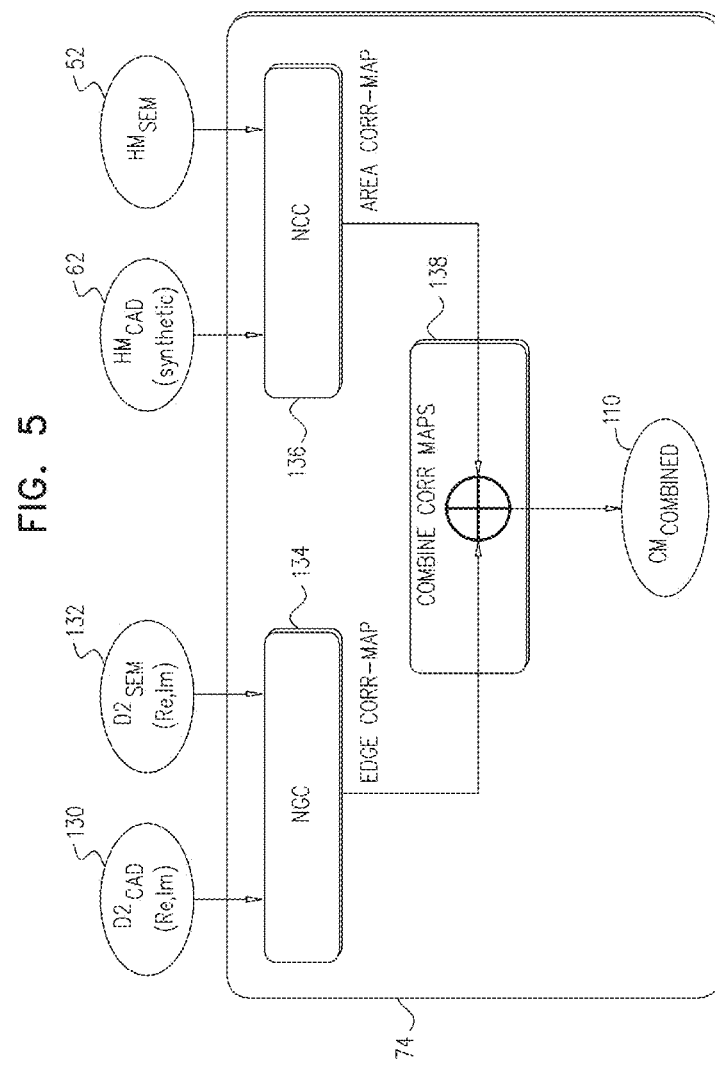
FIG. 5 is a flow chart that schematically illustrates a method for correlation of SEM- and CAD-based maps, in accordance with an embodiment of the present invention.

FIG. 5 is a flow chart that schematically shows details of correlation step 74, in accordance with an embodiment of the present invention. Following post-processing steps 68 and 70, processor 28 applies a normalized gradient correlation (NGC) 134 to compare a simulated directionality map 130 ($D2_{CAD}$) with an actual directionality map 132 ($D2_{SEM}$).

If actual and simulated height maps 52 and 62 are also to be compared, processor 28 computes a normalized cross correlation (NCC) 136 between these maps, as is known in the art. In distinction to the NGC map, which represents the correlation of edges between the input images, the NCC map represents the correlation of the heights of the features appearing in the images.

Processor 28 combines the NGC and NCC maps to give a combined correlation map 110, at a correlation combination step 138. Map 110 contains a combined correlation map value CM at each point u.

The invention is not limited by the operations described above for implementation of correlation step 74. Other embodiments of the invention can use other combination and correlation methods. For example, correlation step 74 can be implemented by taking a vector of four elements for each pixel representing directional maps in X and Y and a height map in X and Y, and performing correlation between these vectors.

At step 76, processor 28 typically chooses the value of u that has the highest peak value in correlation map 110.

Figure 6:
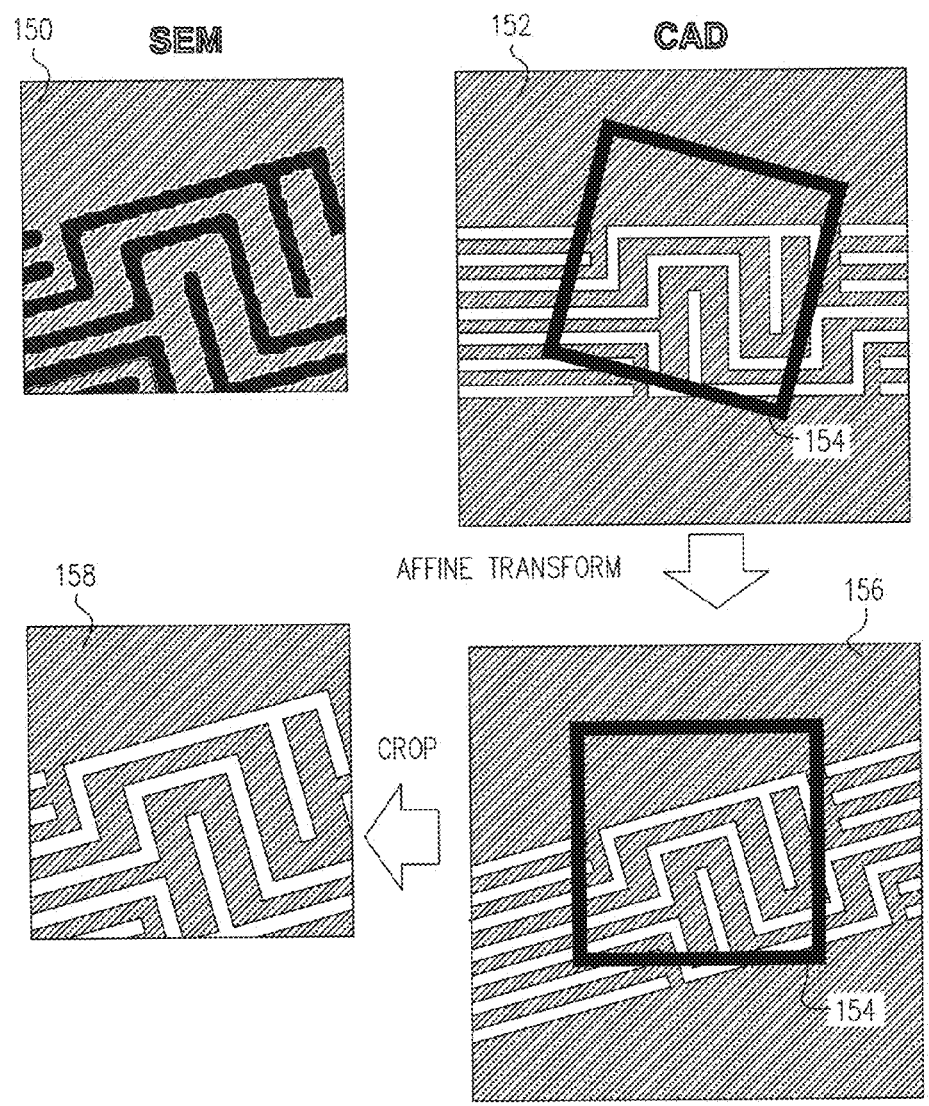
FIG. 6 is a flow chart showing schematically, in graphical form, a method for registering a simulated CAD-based image and a SEM image by transforming the simulated image, in accordance with an embodiment of the present invention.

FIG. 6 is a flow chart showing images that exemplify the operations performed by processor 28 at steps 78 and 80, in accordance with an embodiment of the present invention. A SEM image 150 in this example is found at step 76 to be offset relative to the center of a simulated image 152 based on the CAD clip, and also to be rotated relative to the CAD clip. The area of SEM image 150 is indicated by a border 154 that is superimposed on simulated image 152.

Therefore, at step 78, processor 28 computes an affine transform, with translational, rotational and scaling components. The processor applies this transform at step 80 in order to generate a transformed simulated image 156, which has been shifted and rotated to bring it into alignment with image 150. Processor 28 may then crop image 156 along border 154 to give a final, output simulated image 158, which is registered with SEM image 150.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for image processing, comprising:
   providing a microscopic image of a structure fabricated on a substrate and computer-aided design (CAD) data used in fabricating the structure;
   generating, by a computer, a first directionality map for the microscopic image, the first directionality map comprising, for a matrix of points in the microscopic image, respective directionality vectors corresponding to magnitudes and directions of edges at the points irrespective of a sign of the magnitudes;
   producing a simulated image based on the CAD data;
   generating, by the computer, a second directionality map based on the simulated image;
   generating, based on the microscopic image, a first height map indicative of a three-dimensional (3D) shape of the structure;
   generating a second height map of the structure based on the CAD data; and
   registering the microscopic image with the CAD data based on a combination of a first comparison of the first and second directionality maps with a second comparison of the first and second height maps.

2. The method according to claim 1, wherein the substrate is a semiconductor wafer, and the structure is a part of a microelectronic device formed on the wafer, and wherein providing the microscopic image comprises capturing the image using a scanning electron microscope (SEM).

3. The method according to claim 1, wherein each of the first and second directionality maps is generated by applying a gradient operator to an image, thereby computing a respective gradient vector at each point, and doubling an angular component of the gradient vector at each point to find the directionality vectors.

4. The method according to claim 1, wherein generating the first directionality map and producing the simulated image comprises post-processing the directionality vectors in at least one of the first and second directionality maps to modify the magnitudes of at least one of the directionality vectors responsively to the directions thereof.

5. The method according to claim 4, wherein post-processing the directionality vectors comprises applying an operation to the directionality vectors selected from a group of operations consisting of whitening, X-Y balancing, and corner balancing.

6. The method according to claim 1, wherein registering comprises:
   computing a correlation map between the first and second directionality maps; and
   identifying a peak in the correlation map in order to define a transformation between the CAD data and the microscopic image.

7. Apparatus for image processing, comprising:
   a memory, which is configured to store a microscopic image of a structure fabricated on a substrate and computer-aided design (CAD) data used in fabricating the structure; and
   a processor, which is configured to generate a first directionality map for the microscopic image, the first directionality map comprising a matrix of points in the microscopic image, respective directionality vectors corresponding to magnitudes and directions of edges at the points irrespective of a sign of the magnitudes;
   produce a simulated image based on the CAD data;
   generate a second directionality map based on the simulated image;
   generate, based on the microscopic image, a first height map indicative of a three-dimensional (3D) shape of the structure;
   generate a second height map of the structure based on the CAD data; and
   register the microscopic image with the CAD data based on a combination of a first comparison of the first and second directionality maps with a second comparison of the first and second height maps.

8. The apparatus according to claim 7, wherein the substrate is a semiconductor wafer, and the structure is a part of a microelectronic device formed on the wafer, and wherein the microscopic image is a scanning electron microscope (SEM) image.

9. The apparatus according to claim 7, wherein the processor is to generate the first and second directionality maps by applying a gradient operator to an image, thereby computing a respective gradient vector at each point, and doubling an angular components of the gradient vector at each point to find the directionality vectors.

10. The apparatus according to claim 7, wherein to generate the first directionality map and produce the simulate image, the processor is to:
    post-process the directionality vectors in at least one of the first and second directionality maps to modify the magnitudes of at least one of the directionality vectors responsively to the directions thereof.

11. The apparatus according to claim 10, wherein the processor is to post-process the directionality vectors by applying an operation to the directionality vectors selected from a group of operations consisting of whitening, X-Y balancing, and corner balancing.

12. The apparatus according to claim 7, wherein to register, the processor is to:
    compute a correlation map between the first and second directionality maps; and identify a peak in the correlation map in order to define a transformation between the CAD data and the microscopic image.

13. A computer software product, comprising a non-transitory computer-readable medium in which program instructions are stored, which instructions, when read by a computer, cause the computer to:

receive a microscopic image of a structure fabricated on a substrate and computer-aided design (CAD) data used in fabricating the structure;

generate a first directionality map for the microscopic image, the first directionality map comprising, for a matrix of points in the microscopic image, respective directionality vectors corresponding to magnitudes and directions of edges at the points irrespective of a sign of the magnitudes;

produce a simulated image based on the CAD data;

generate a second directionality map based on the simulated image;

generate, based on the microscopic image, a first height map indicative of a three-dimensional (3D) shape of the structure;

generate a second height map of the structure based on the CAD data; and register the microscopic image with the CAD data based on a combination of a first comparison of the first and second directionality maps with a second comparison of the first and second height maps.

14. The product according to claim 13, wherein the instructions cause the computer to generate the first and second directionality maps by applying a gradient operator to an image, thereby computing a respective gradient vector at each point, and doubling an angular component of the gradient vector at each point to find the directionality vectors.

15. The product according to claim 13, wherein to generate the first directionality map and produce the simulated image, the computer is to post-process the directionality vectors in at least one of the first and second directionality maps to modify the magnitudes of at least one of the directionality vectors responsively to the directions thereof.

16. The product according to claim 13, wherein the instructions cause the computer to post-process the directionality vectors by applying an operation to the directionality vectors selected from a group of operations consisting of whitening, X-Y balancing, and corner balancing.

17. The product according to claim 13, wherein to register, the computer is to:

compute a correlation map between the first and second directionality maps; and identify a peak in the correlation map in order to define a transformation between the CAD data and the microscopic image.

18. A method for image processing, comprising:

receiving, by a computer from a scanning electron microscope (SEM), a microscopic image of a structure fabricated on a substrate and computer-aided design (CAD) data used in fabricating the structure;

generating, by the computer, a first directionality map for the microscopic image, the first directionality map comprising for a matrix of points in the microscopic image, respective directionality vectors corresponding to magnitudes and directions of edges at the points, wherein the first directionality map is generated by applying a gradient operator to the microscopic image, thereby computing a respective gradient vector at each point, and doubling an angular component of the gradient vector at each point to find the directionality vectors, wherein the directionality vectors are insensitive to differences between light-to-dark transitions and dark-to-light transitions;

performing, by the computer, SEM simulation based on the CAD data to produce a simulated Grey-level image;

generating, by the computer, a second directionality map based on the simulated Grey-level image, the second directionality map comprising, for a matrix of points in the simulated Grey-level image, respective directionality vectors corresponding to magnitudes and directions of edges at the points, wherein the second directionality map is generated by applying the gradient operator to the simulated image, thereby computing a respective gradient vector at each point, and doubling an angular component of the gradient vector at each point to find the directionality vectors, wherein the directionality vectors are insensitive to differences between light-to-dark transitions and dark-to-light transitions; and registering the microscopic image with the CAD data based on a comparison of the first and second directionality maps.

19. The method of claim 18, wherein the substrate is a semiconductor wafer, and the structure is a part of a microelectronic device formed on the wafer, and wherein receiving the microscopic image comprises capturing the image using the scanning electron microscope.

20. The method of claim 18, further comprising post-processing the directionality vectors in at least one of the first and second directionality maps so as to modify the magnitudes of at least one of the directionality vectors responsively to the directions thereof.

21. The method of claim 20, wherein post-processing the directionality vectors comprises applying an operation to the directionality vectors selected from a group of operations consisting of whitening, X-Y balancing, and corner balancing.

22. The method of claim 18, wherein registering comprises:

computing a correlation map between the first and second directionality maps; and identifying a peak in the correlation map to define a transformation between the CAD data and the microscopic image.

23. The method according to claim 18, wherein registering comprises:

generating, based on the microscopic image, a first height map indicative of a three-dimensional (3D) shape of the structure;

generating a second height map of the structure based on the CAD data; and combining a first comparison of the first and second directionality maps with a second comparison of the first and second height maps to register the microscopic image with the CAD data.

24. An apparatus for image processing, the apparatus comprising:

a memory to store a microscopic image of a structure fabricated on a substrate and computer-aided design (CAD) data used in fabricating the structure; and a processor, coupled to the memory, the processor to:

generate a first directionality map for the microscopic image, the first directionality map comprising a matrix of points in the microscopic image, respective directionality vectors corresponding to magnitudes and directions of edges at the points, wherein the first directionality map is generated by applying a gradient operator to the microscopic image, thereby computing a respective gradient vector at each point, and doubling an angular component of the gradient vector at each point to find the directionality vectors, wherein the directionality vectors are insensitive to differences between light-to-dark transitions and dark-to-light transitions, produce a simulated Grey-level image by performing a scanning electron microscope (SEM) simulation based on the CAD data;

generate a second directionality map based on the simulated Grey-level image, the second directionality map comprising, for a matrix of points in the simulated Grey-level image, respective directionality vectors corresponding to magnitudes and directions of edges at the points, wherein the second directionality map is generated by applying the gradient operator to the simulated image, thereby computing a respective gradient vector at each point, and doubling an angular component of the gradient vector at each point to find the directionality vectors, wherein the directionality vectors are insensitive to differences between light-to-dark transitions and dark-to-light transitions; and register the microscopic image with the CAD data based on a comparison of the first and second directionality maps.

25. The apparatus of claim 24, wherein the substrate is a semiconductor wafer, and the structure is a part of a microelectronic device formed on the wafer, and wherein the microscopic image is a SEM image.

26. The apparatus of claim 24, wherein the processor is further to:

post-process the directionality vectors in at least one of the first and second directionality maps to modify the magnitudes of at least one of the directionality vectors responsively to the directions thereof.

27. The apparatus of claim 26, wherein the processor is further to:

post-process the directionality vectors by applying an operation to the directionality vectors selected from a group of operations consisting of whitening, X-Y balancing, and corner balancing.

28. The apparatus of claim 24, wherein the processor is further to:

compare the first and second directionality maps by computing a correlation map between the first and second directionality maps; and identify a peak in the correlation map to define a transformation between the CAD data and the microscopic image.

29. The apparatus of claim 24, wherein the processor is further to:

generate, based on the microscopic image, a first height map indicative of a three-dimensional (3D) shape of the structure;

generate a second height map of the structure based on the CAD data; and combine a first comparison of the first and second directionality maps with a second comparison of the first and second height maps to register the microscopic image with the CAD data.

30. A computer software product, comprising a non-transitory computer-readable medium in which program instructions are stored, which instructions, when read by a computer, cause the computer to:

receive a microscopic image of a structure fabricated on a substrate and computer-aided design (CAD) data used in fabricating the structure;

generate a first directionality map for the microscopic image, the first directionality map comprising, for a matrix of points in the microscopic image, respective directionality vectors corresponding to magnitudes and directions of edges at the points, wherein the first directionality map is generated by applying a gradient operator to the microscopic image, thereby computing a respective gradient vector at each point, and doubling an angular component of the gradient vector at each point to find the directionality vectors, wherein the directionality vectors are insensitive to differences between light-to-dark transitions and dark-to-light transitions;

produce a simulated Grey-level image by SEM simulation, based on the CAD data;

generate a second directionality map based on the simulated Grey-level image, the second directionality map comprising, for a matrix of points in the simulated Grey-level image, respective directionality vectors corresponding to magnitudes and directions of edges at the points, wherein the second directionality map is generated by applying the gradient operator to the simulated image, thereby computing a respective gradient vector at each point, and doubling an angular component of the gradient vector at each point to find the directionality vectors, wherein the directionality vectors are insensitive to differences between light-to-dark transitions and dark-to-light transitions; and register the microscopic image with the CAD data, based on the first and second directionality maps.

31. The product according to claim 30, wherein the instructions cause the computer to post-process the directionality vectors in at least one of the first and second directionality maps to modify the magnitudes of at least one of the directionality vectors responsively to the directions thereof.

32. The product according to claim 30, wherein the instructions cause the computer to post-process the directionality vectors by applying an operation to the directionality vectors selected from a group of operations consisting of whitening, X-Y balancing, and corner balancing.

33. The product according to claim 30, wherein the instructions cause the computer to:

compare the first and second directionality maps by computing a correlation map between the first and second directionality maps; and identify a peak in the correlation map to define a transformation between the CAD data and the microscopic image.

34. The product according to claim 30, wherein the instructions cause the computer to:

generate, based on the microscopic image, a first height map indicative of a three-dimensional (3D) shape of the structure;

generate a second height map of the structure based on the CAD data; and combine a first comparison of the first and second directionality maps with a second comparison of the first and second height maps to register the microscopic image with the CAD data.

* * * * *

UNITED STATES PATENT AND TRADEMARK OFFICE
CERTIFICATE OF CORRECTION

PATENT NO. : 9,715,724 B2  
APPLICATION NO. : 14/446295  
DATED : July 25, 2017  
INVENTOR(S) : Ishai Schwarzband et al.

Page 1 of 1

It is certified that error appears in the above-identified patent and that said Letters Patent is hereby corrected as shown below:

In Claim 9, Column 10, Line 50, delete "components" and insert --component--

In Claim 18, Column 11, Line 61, insert --,-- after "comprising"

Signed and Sealed this
Fifteenth Day of May, 2018

Andrei Iancu
*Director of the United States Patent and Trademark Office*